(12) United States Patent
Asaka et al.

(10) Patent No.: US 11,006,569 B2
(45) Date of Patent: May 18, 2021

(54) WORK VEHICLE

(71) Applicant: KOMATSU LTD., Tokyo (JP)

(72) Inventors: Hirokazu Asaka, Tokyo (JP); Shinichi Yonezawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 146 days.

(21) Appl. No.: 16/044,843

(22) Filed: Jul. 25, 2018

(65) Prior Publication Data

US 2019/0029169 A1    Jan. 31, 2019

(30) Foreign Application Priority Data

Jul. 28, 2017   (JP) .............................. JP2017-146818

(51) Int. Cl.
*A01C 11/02*   (2006.01)
*A01C 11/00*   (2006.01)
*A01C 7/20*    (2006.01)

(52) U.S. Cl.
CPC .............. *A01C 11/02* (2013.01); *A01C 7/208* (2013.01); *A01C 11/006* (2013.01)

(58) Field of Classification Search
CPC ....... A01C 11/02; A01C 11/00; A01C 11/006; A01C 23/007; A01C 23/00; A01C 23/008; A01C 7/208; A01C 7/20; A01C 7/00
See application file for complete search history.

(56) References Cited

U.S. PATENT DOCUMENTS

| | | | | |
|---|---|---|---|---|
| 2,771,043 A | * | 11/1956 | Carlson | A01C 7/208 |
| | | | | 111/200 |
| 3,391,663 A | * | 7/1968 | Cagle | A01B 59/041 |
| | | | | 111/200 |
| 3,524,419 A | * | 8/1970 | Gibson | A01C 11/02 |
| | | | | 111/100 |
| 4,266,489 A | * | 5/1981 | Parramore | B62D 49/0607 |
| | | | | 111/200 |
| 5,322,129 A | | 6/1994 | Sheeter | |
| 5,402,740 A | | 4/1995 | Kinoshita et al. | |
| 5,636,830 A | * | 6/1997 | Chartrand | B60S 9/12 |
| | | | | 254/423 |
| 6,164,223 A | | 12/2000 | Eriksson | |
| 6,634,306 B1 | | 10/2003 | Faulring | |
| 2012/0304906 A1 | | 12/2012 | Audigie | |

FOREIGN PATENT DOCUMENTS

| | | | | |
|---|---|---|---|---|
| CA | 908507 A | * | 8/1972 | ............. A01C 11/02 |
| JP | 2-31602 A | | 2/1990 | |
| JP | 4-187015 A | | 7/1992 | |
| JP | 2013-520192 A | | 6/2013 | |
| WO | 2008/053071 A1 | | 5/2008 | |

OTHER PUBLICATIONS

The Office Action of the corresponding Japanese application No. 2017-146818, dated Mar. 30, 2021.

* cited by examiner

*Primary Examiner* — Christopher J. Novosad
(74) *Attorney, Agent, or Firm* — Global IP Counselors, LLP

(57) ABSTRACT

The tree planting machine includes a vehicle main unit, a beam, and a plurality of planting devices. The beam is attached to the vehicle main unit along the vehicle width direction, and is longer than the vehicle width of the vehicle main unit. The plurality of planting devices are attached to the beam.

12 Claims, 12 Drawing Sheets

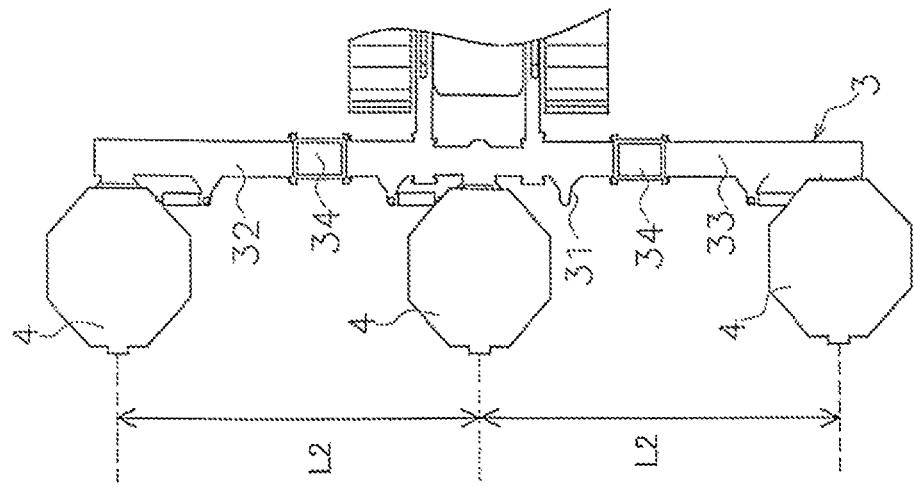
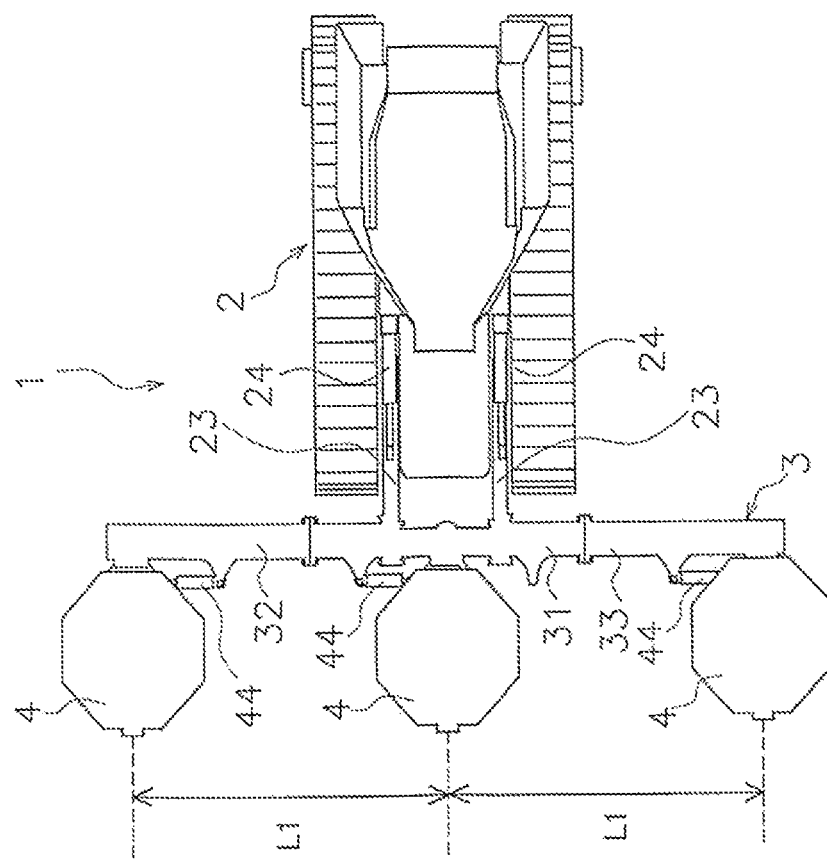

＃ WORK VEHICLE

CROSS-REFERENCE TO RELATED APPLICATIONS

This application claims priority under 35 U.S.C. § 119 to Japanese Patent Application No. 2017-146818 filed on Jul. 28, 2017. The entire disclosure of Japanese Patent Application JP 2017-146818 is hereby incorporated herein by reference.

BACKGROUND

Technical Field

The present invention relates to a work vehicle.

Description of the Related Art

In forestation work, seedlings are planted in the ground, but in recent years there have been proposals for mechanizing this work (see, for example, U.S. Pat. No. 6,164,223).

U.S. Pat. No. 6,164,223 discloses a configuration in which a plurality of planting arms are provided around a vehicle, as shown in FIG. 1. With the device disclosed in U.S. Pat. No. 6,164,223, two planting arms are provided on each of the left and right sides of the vehicle, and the planting arms can plant seedlings at the same time.

SUMMARY

However, while the apparatus of U.S. Pat. No. 6,164,223 is suited to forestation on a smaller scale, it is not suited to forestation of large tracts of land.

When trees are planted over a large area of land, many of them are planted in rows. Planting trees simultaneously in a plurality of rows may be possible with the apparatus of the above-mentioned U.S. Pat. No. 6,164,223, but since the planting arms are provided independently and the arms are driven separately, the positioning of each planting arm has to be controlled with polar coordinates, so the mechanism and control become more complicated than necessary.

It is an object of the present invention to provide a work vehicle capable of simultaneously planting in a plurality of places with a simple configuration.

The planting device according to the first aspect comprises a vehicle main unit, a beam, and a plurality of planting devices. The beam is attached to the vehicle main unit along the vehicle width direction, and is longer than the vehicle width of the vehicle main unit. The planting devices are attached to the beam.

The present invention provides a work vehicle capable of simultaneously planting in a plurality of places with a simple configuration.

BRIEF DESCRIPTION OF DRAWINGS

FIG. 3A is a plan view of the state when the spacers have been removed from the planting machine of FIG. 1;

FIG. 3B is a partial plan view of the state when spacers have been mounted in the planting machine of FIG. 1;

DETAILED DESCRIPTION OF THE EMBODIMENT(S)

A tree planting machine that is an example of the work vehicle of the present invention will now be described through reference to the drawings. In the following description, the terms "upper," "lower," "front," "rear," "left," and "right" are in reference to the operator seated in the driver's seat.

Figure 1:
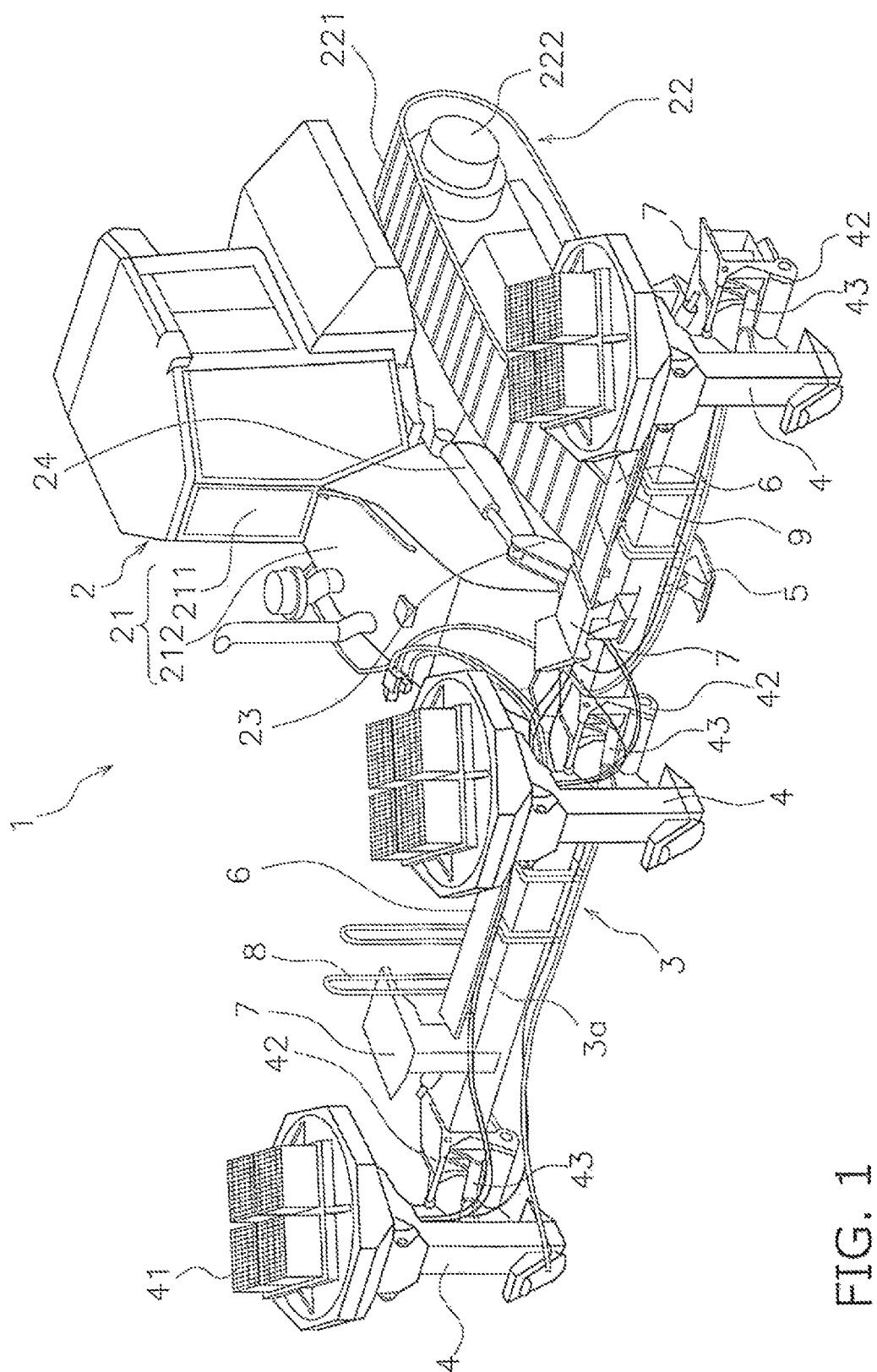
FIG. 1 is an oblique view of a tree planting machine in an embodiment of the present invention.
Figure 2:
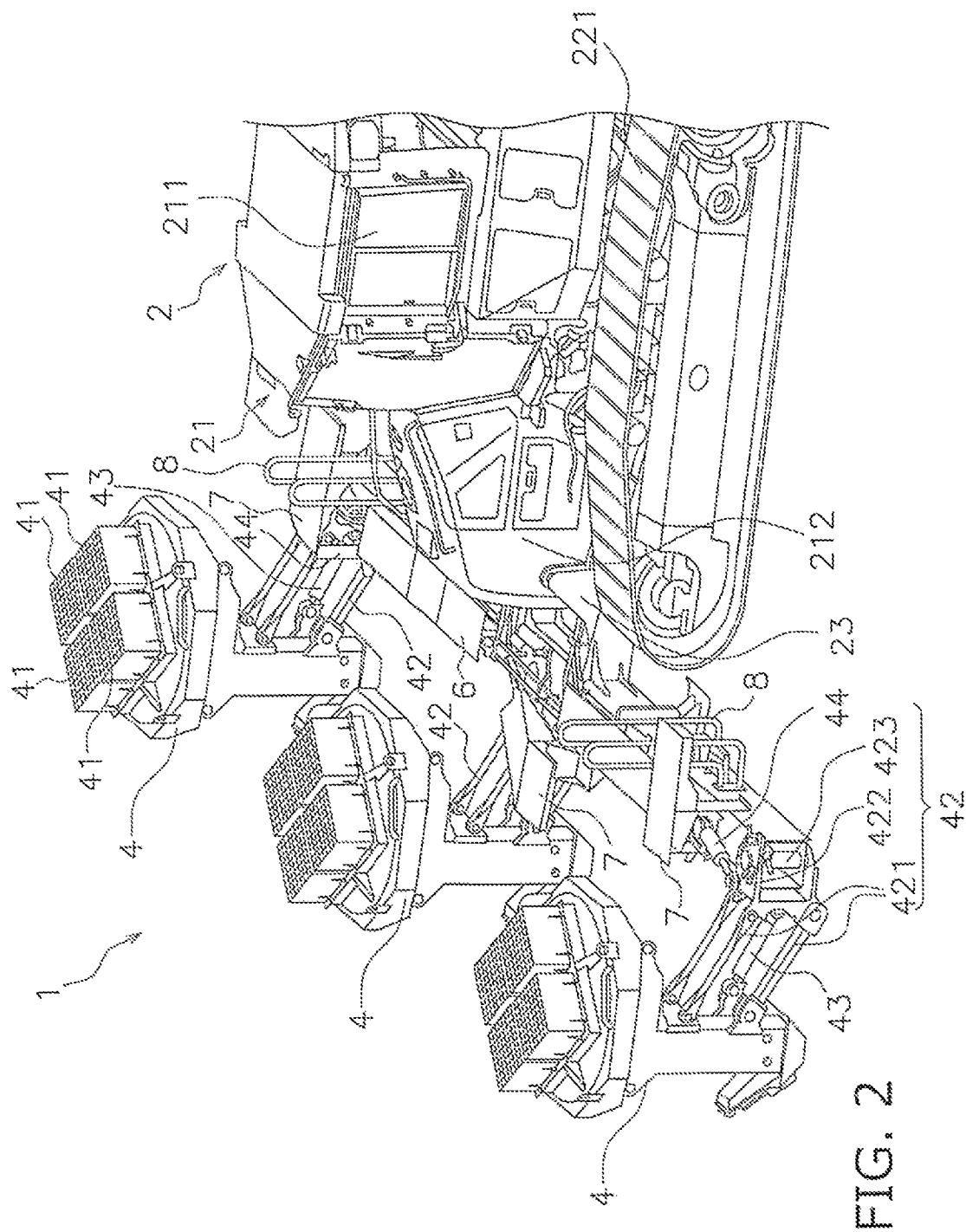
FIG. 2 is an oblique view of the front portion of the planting machine in FIG. 1 as viewed from the left side.

FIG. 1 is a simplified diagram of the configuration of a tree planting machine 1 in an embodiment of the present invention. FIG. 2 is an oblique view of the front part of the tree planting machine 1 as viewed from the left side.

The tree planting machine 1 is a device for planting seedlings, and comprises a vehicle main unit 2, a beam 3, a plurality of planting devices 4, support legs 5, a walkway 6, work tables 7, a handrail 8, and a plurality of hydraulic pipes 9.

The vehicle main unit 2 is a vehicle that can travel. The beam 3 is disposed on the front side of the vehicle main body 2, running along the vehicle width direction (left and right direction), and is fixed to the vehicle main unit 2. The plurality of planting devices 4 are fixed to the beam 3. The walkway 6 is disposed on the upper face 3a of the beam 3, and allows a worker to move. The work tables 7 are disposed near the planting devices 4, and allow a worker to stand. The handrail 8 is grasped by a worker when climbing up to the walkway 6 or climbing down from the walkway 6. The pipes 9 supply hydraulic fluid for driving the planting device 4, etc.

The vehicle main unit 2 includes a body 21, a traveling apparatus 22, lift frames 23, and lift hydraulic cylinders 24 (not shown in FIG. 2).

The body 21 has a cab 211 and an engine compartment 212. A driver's seat is disposed in the cab 211. An engine, a hydraulic pump, and the like are disposed in the engine compartment 212.

The traveling apparatus 22 is attached below the body 21, and has a pair of crawler belts 221 (only the left side is shown in FIG. 1), a sprocket 222, an idler, and so forth. The crawler belts 221 rotate according to the drive of the sprocket 222, causing the vehicle main unit 2 to travel.

The lift frames 23 are provided as a pair on the left and right sides, and are disposed to the inside of the traveling apparatus 22 in the vehicle width direction. The lift frames 23 are attached to the body 21 so as to be able to pivot up and down around an axis X (see FIG. 5) that is parallel to the vehicle width direction. The beam 3 is fixed to the distal ends of lift frames 23.

The lift hydraulic cylinders 24 are linked to the body 21 and the central upper part of the lift frames 23. As the lift hydraulic cylinders 24 expand and contract, the lift frames 23 pivot up and down, and the beam 3 also pivots.

FIG. 3A is a plan view showing the tree planting machine 1 in simplified form.

The beam 3 has a long rectangular shape and is disposed on the front side of the vehicle main unit 2 so that the lengthwise direction of the beam 3 runs along the vehicle width direction (left and right direction). The length of the beam 3 in the vehicle width direction is set to be greater than the vehicle width of the vehicle main unit 2. That is, the beam 3 protrudes to the right and left sides of the vehicle main unit 2. As shown in FIG. 3A, the beam 3 has a center portion 31, a right end portion 32, and a left end portion 33. The center portion 31 is fixed to the lift frames 23. The right end portion 32 is provided on the right side of the center portion 31. The right end portion 32 and the center portion 31 are fixed to each other by connecting flange portions provided at respective ends thereof with bolts or the like. The left end portion 33 is provided on the left side of the center portion 31. The left end portion 33 and the center portion 31 are fixed to each other by connecting flange portions provided at respective ends thereof with bolts or the like.

Figure 4:
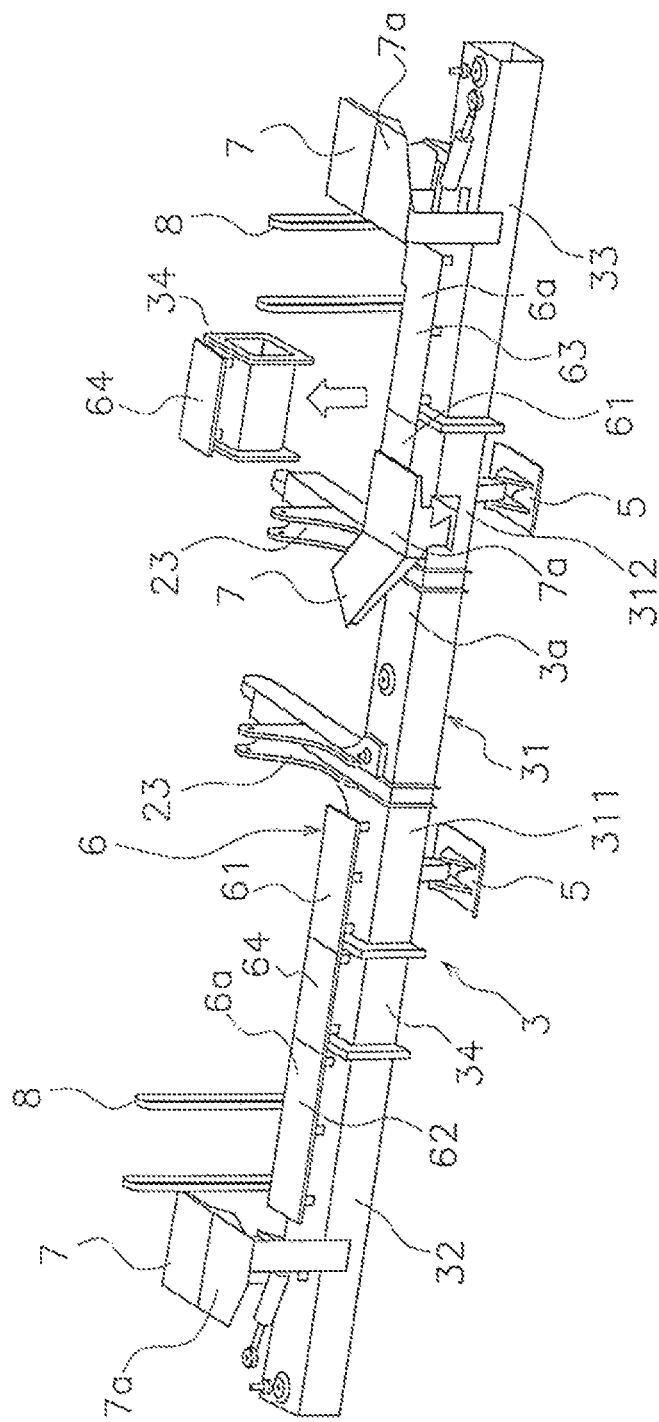
FIG. 4 is an oblique view of the beam of the planting machine in FIG. 1.

It is also possible to dispose spacers 34 between the center portion 31 and the right end portion 32, and between the center portion 31 and the left end portion 33. FIG. 3B is a plan view of the beam 3 in a state in which a spacer 34 is disposed between the center portion 31 and the right end portion 32, and between the center portion 31 and the left end portion 33. FIG. 4 is a diagram showing the state when the spacer 34 has been disposed between the center portion 31 and the right end portion 32, and the spacer 34 has been removed from between the center portion 31 and the left end portion 33.

The spacer 34 is substantially cuboid in shape as shown in FIG. 4. The spacer 34 is detachably fixed between the center portion 31 and the right end portion 32 by bolts or the like. More precisely, a flange is provided at both ends of the spacer 34, and the flanges at the ends of the spacer 34 and the flanges on the center portion 31 and the right end portion 32 are connected by bolts or the like, thereby fixing the spacer 34 between the center portion 31 and the right end portion 32.

Also, the spacer 34 is detachably fixed between the center portion 31 and the left end portion 33 by bolts or the like. More precisely, flanges are provided at both ends of the spacer 34, and the flanges at the ends of the spacer 34 and the flanges on the center portion 31 and the left end portion 33 are connected by bolts or the like, thereby fixing the spacer 34 between the center portion 31 and the left end portion 33.

In this embodiment, one planting device 4 is provided to each of the center portion 31, the right end portion 32, and the left end portion 33, and in a state in which the spacers 34 have not been mounted as shown in FIG. 3A, the spacing of the planting devices 4 is set to L1 (such as 3 meters). The spacing of the planting devices 4 corresponds to the spacing at which the seedlings will be planted.

Meanwhile, when a spacer 34 is disposed between the center portion 31 and the right end portion 32, and a spacer 34 is disposed between the center portion 31 and the left end portion 33, the spacing of the planting devices 4 can be set to L2 (such as 3.5 meters). The spacing of the planting devices 4 can thus be set to either L1 or L2, making it possible to change the spacing of the rows when seedlings are planted in rows.

The planting devices 4 plants the seedlings in the ground. In this embodiment, three planting devices 4 are attached to the beam 3. One planting device 4 is attached to each of the center portion 31, the right end portion 32, and the left end portion 33.

The planting devices 4 and the beam 3 are linked by links 42. As shown in FIG. 2, the links 42 each have a parallel link 421, an attachment component 422, and a pin 423. The pin 423 passes through the beam 3 in the vertical direction. The attachment component 422 is fixed to a portion of the pin 423 above the beam 3, and to a portion of the pin 423 below the beam 3. The attachment component 422 is configured to be able to pivot left and right with respect to the beam 3 around the vertically disposed pin 423.

The parallel link 421 links the planting device 4 and the attachment component 422. The parallel link 421 is able to pivot up and down with the planting device 4 and the attachment component 422. A vertically pivoting cylinder 43 that is expanded and contracted by hydraulic pressure is linked to the planting device 4 and the attachment component 422. The vertically pivoting cylinder 43 is disposed to the inside of the parallel link 421 in the vertical direction. The expansion and contraction of the vertically pivoting cylinder 43 causes the end of the parallel link 421 on the planting device 4 side to pivot up and down around the end on the beam 3 side. This moves the planting device 4 up and down.

A horizontally pivoting cylinder 44 for pivoting the planting device 4 to the left and right is linked to the beam 3 and the attachment component 422. The horizontally pivoting cylinder 44 is disposed substantially along the lengthwise direction of the beam 3, and is expanded and contracted by hydraulic pressure. Since the attachment component 422 pivots left and right with respect to the beam 3 along with the expansion and contraction of the horizontally pivoting cylinder 44, the position of the planting device 4 in the left and right direction can be adjusted in this way.

A plurality of plant trays 41 can be placed on the upper face of each planting device 4. A plant tray 41 is partitioned into a plurality of spaces, and a seedling is placed in each of the partitioned spaces. A pipe-shaped member whose lower end is formed in a beak shape is provided on the inside of the planting device 4, and a hole is made in the ground by this pipe-like member. The seedling held in the plant tray 41 then drops through the pipe-shaped member, and the beaked portion is opened up to place the seedling in the hole.

Figure 5:
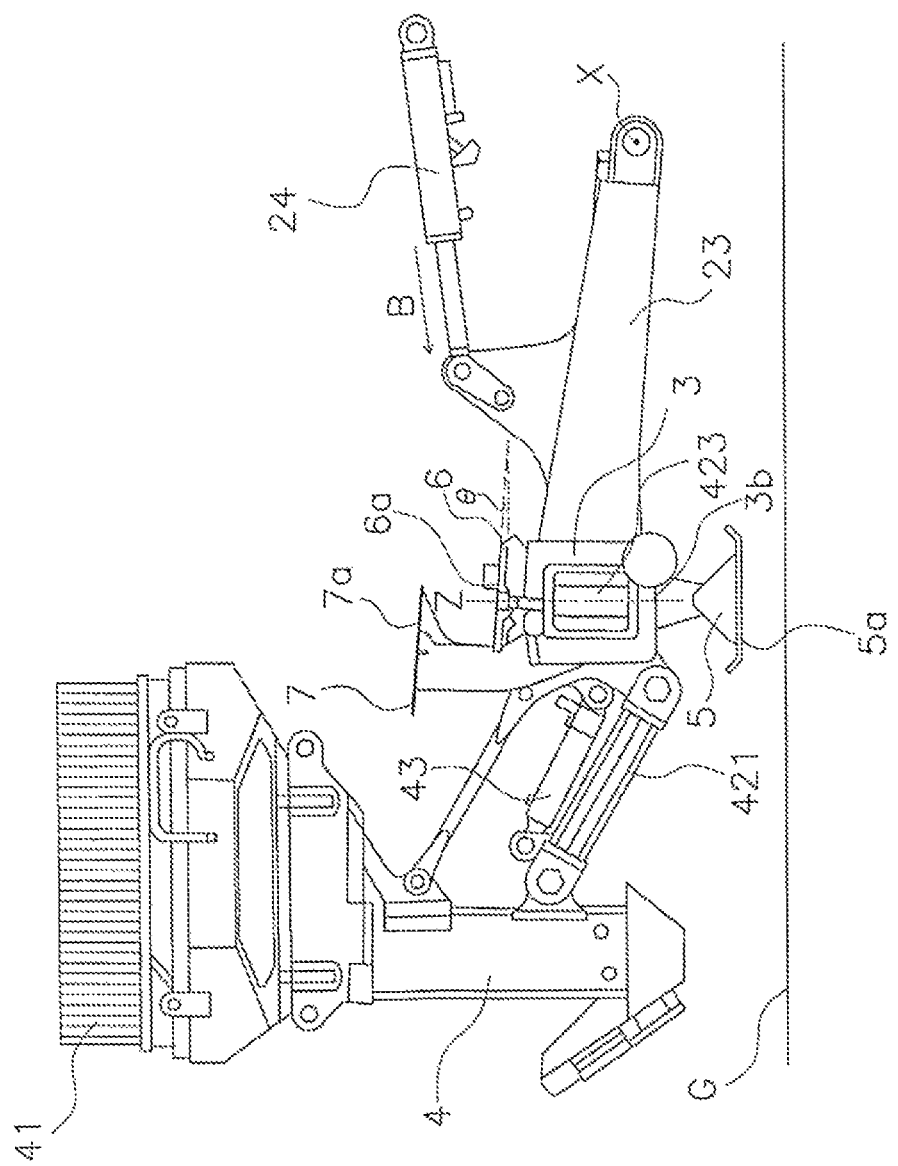
FIG. 5 is a left side view of the state near the beam during planting with the planting machine of FIG. 1.
Figure 6:
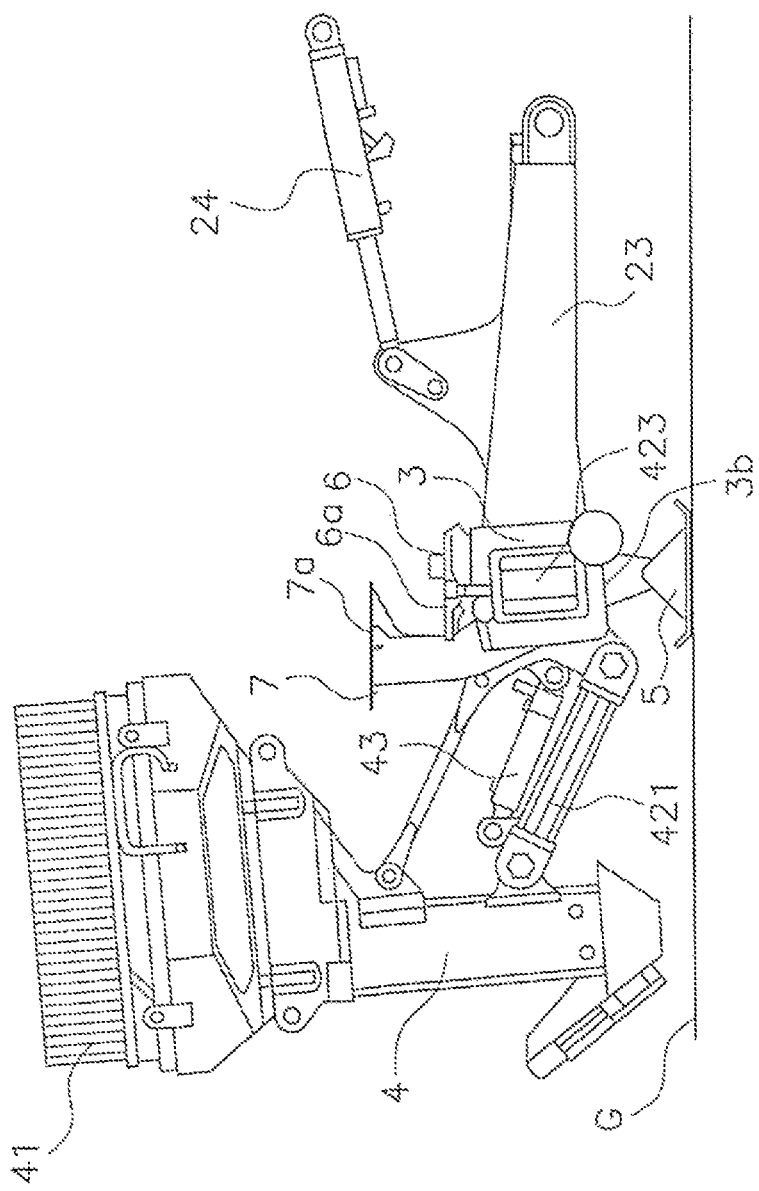
FIG. 6 is a left side view showing the state near the beam when the planting machine of FIG. 1 is parked.

FIG. 5 is a left side view showing the state near the beam 3 during planting. FIG. 6 is a left side view showing the state near the beam 3 when the vehicle is parked.

As shown in FIGS. 5 and 6, the support leg 5 is fixed to the lower face 3b of the beam 3. As shown in FIG. 4, two support legs 5 are attached to the center portion 31 of the beam 3.

More precisely, one of the two support legs 5 is fixed to the right side portion 311, which is to the right of the right side lift frame 23, out of the center portion 31 of the beam 3. The other supporting leg 5 is fixed to the left side portion 312, which is to the left of the left side lift frame 23, out of the center portion 31 of the beam 3.

From the state shown in FIG. 5, when the vehicle is to be parked, the lift hydraulic cylinders 24 (see arrow B) are extended to lower the beam 3, and the lower faces 5a of the support legs 5 come into contact with the ground G as shown in FIG. 6. Consequently, when the vehicle is parked, the load of the beam 3 and the planting devices 4 can be supported by the support legs 5, so that parking can be performed without the planting devices 4 coming into contact with the ground G.

As shown in FIG. 4, the walkway 6 is provided on the upper face 3a of the beam 3. The walkway 6 has two center walkways 61, a right end walkway 62, and a left end walkway 63. The upper faces of the center walkways 61, the right end walkway 62, and the left end walkway 63 are provided at the same height from the beam 3, and are shown as the upper face 6a.

The two center walkways 61 are provided in the center portion 31 of the beam 3. More precisely, each center walkway 61 is disposed to the outside of the portion where the two lift frames 23 are connected. The right end walkway 62 is provided at the right end portion 32 of the beam 3. The left end walkway 63 is provided at the left end portion 33 of the beam 3.

Also, the spacers 34 are provided with extension walkways 64. As shown in FIG. 4, when the spacer 34 is inserted between the center portion 31 and the right end portion 32, the extension walkway 64 is disposed in substantially the same plane as the center walkway 61 and the right end walkway 62. When the spacer 34 is inserted between the center portion 31 and the left end portion 33, the extension walkway 64 is disposed in substantially the same plane as the center walkway 61 and the left end walkway 63.

The walkway 6 is disposed on the beam 3 so that its upper face 6a is substantially horizontal in a state in which the support legs 5 are in contact with the ground as shown in the side view in FIG. 6. That is, in the planting state shown in FIG. 5, the beam 3 is raised up and the upper face 6a of the walkway 6 is not horizontal but slightly inclined (see θ in FIG. 5; for example, θ can be set to 4.9°). In the planting state shown in FIG. 5, since the pins 423 are disposed along the vertical direction, the upper face 6a of the walkway 6 can be said to be inclined from a direction perpendicular to the direction of the axis Z of the pins 423.

Three work tables 7 are provided on the beam 3, as shown in FIG. 1. Each work table 7 is disposed near a planting device 4. The work tables 7 are set to be positioned higher than the walkway 6. The worker walks along the walkway 6 and stands on a work table 7 to replace the plant tray 41 placed on the upper face of the planting device 4 or do some other such job. In this embodiment, the upper faces 7a of the three work tables 7 are all the same height from the beam 3.

More precisely, as shown in FIG. 4, the work table 7 near the planting device 4 attached to the center portion 31 is disposed to the left of the pair of lift frames 23. The work table 7 near the planting device 4 attached to the right end portion 32 is disposed to the right of the right end walkway 62. The work table 7 near the planting device 4 attached to the left end portion 33 is to disposed to the left of the left end walkway 63.

Just as with the upper face 6a of the walkway 6, the upper faces 7a of the work tables 7 are disposed on the beam 3 so as to be substantially horizontal when viewed front the side in a state in which the support legs 5 are touching the ground (see FIG. 6). That is, in the planting state shown in FIG. 5, the beam 3 is lifted up and the upper face 7a of the work table 7 is not horizontal but slightly inclined (see θ in FIG. 5; for example, θ 0 can be set to 4.9°). In the planting state shown in FIG. 5, since the pins 423 are disposed in the vertical direction, the upper faces 7a of the work tables 7 can be said to be inclined from the direction perpendicular to the direction of the Z axis of the pins 423.

The handrail 8 is provided to be grasped when a worker climbs up to the walkway 6 or climbs down from the walkway 6. Two handrails 8 are provided to the rear of the beam 3. As shown in FIG. 4, one of the two handrails 8 is fixed to the right end portion 32 of the beam 3 and to the inside of the work table 7. The other handrail 8 is fixed to the left end portion 33 of the beam 3 and to the inside of the work table 7.

Figure 7:
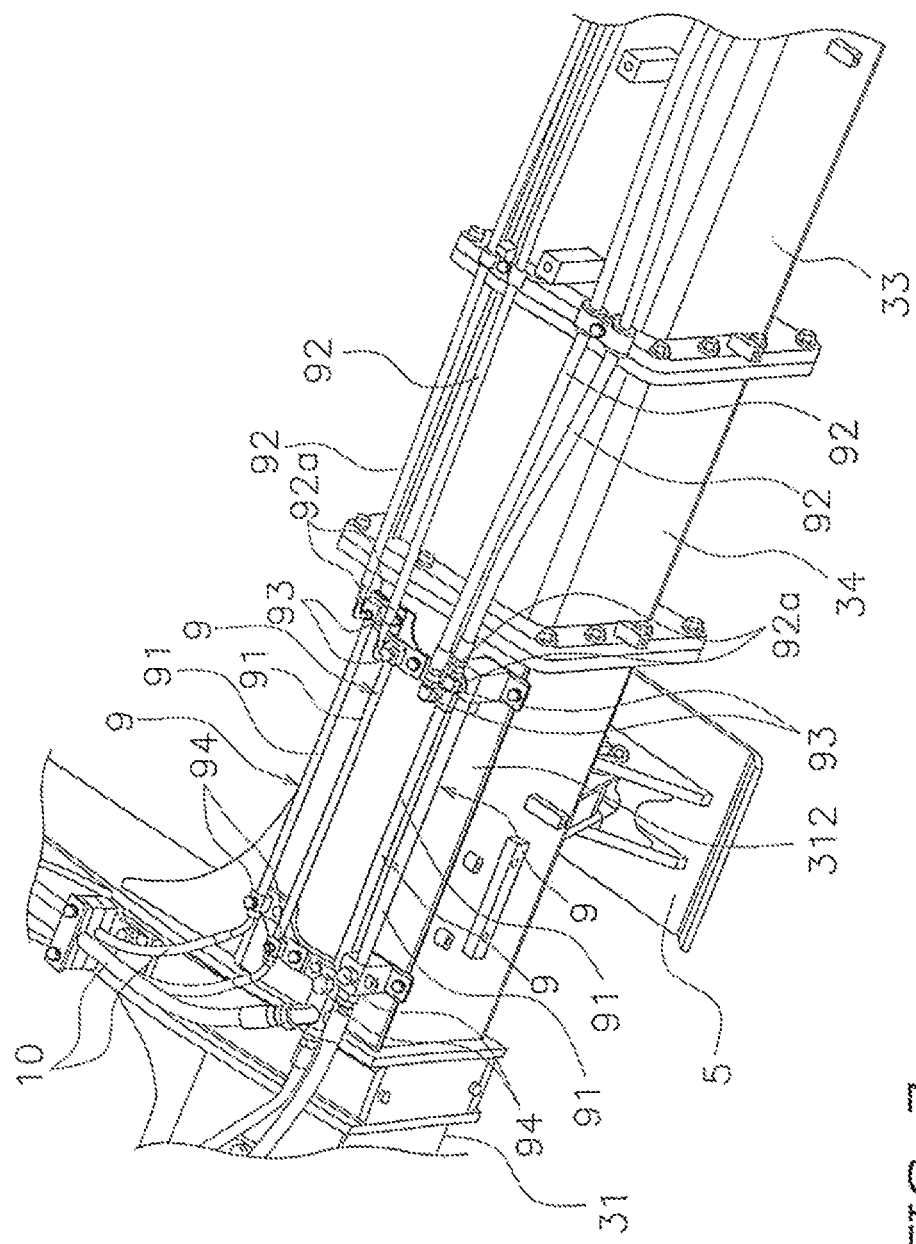
FIG. 7 is an oblique view of the state when a spacer has been inserted between the center portion and the left end portion of the beam of the planting machine of FIG. 1.
Figure 8:
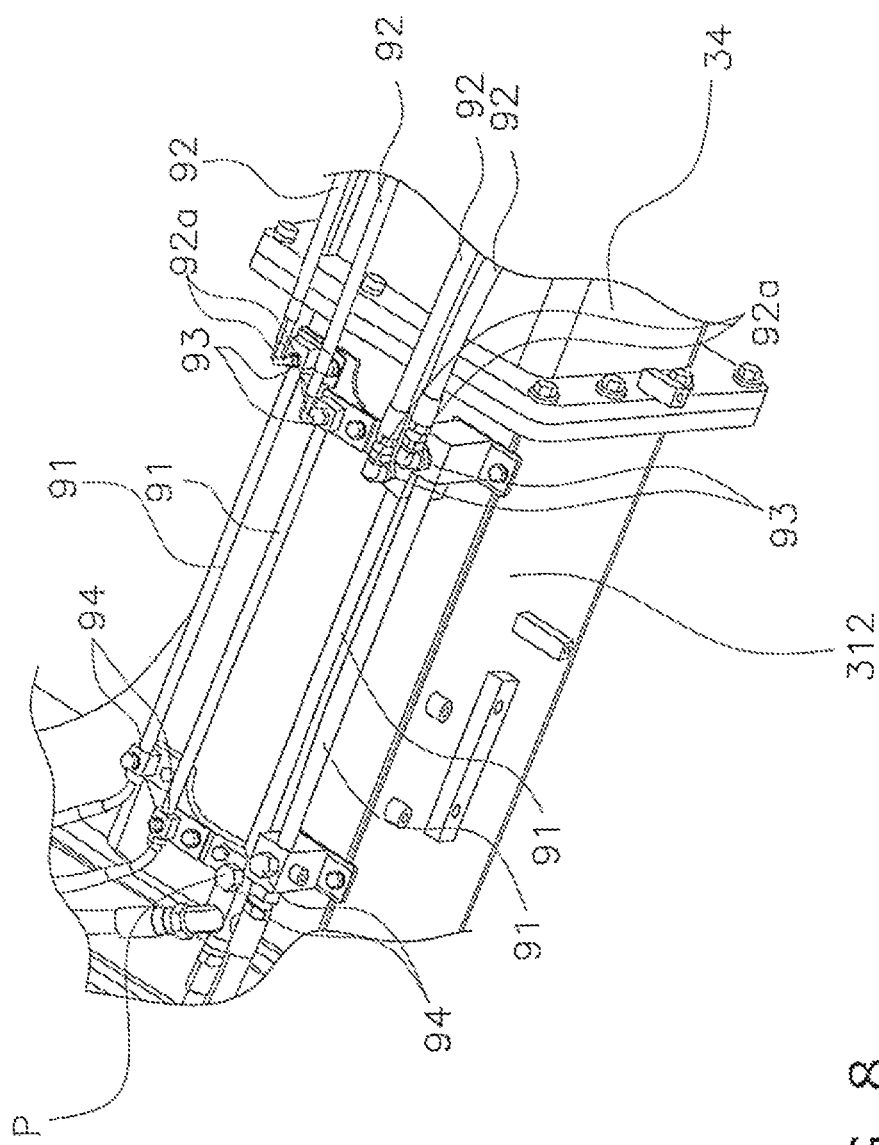
FIG. 8 is an enlarged oblique view of the area near the left side portion in FIG. 7.

FIG. 7 is a diagram of the state when the spacer 34 has been inserted between the center portion 31 and the left end portion 33 of the beam 3. FIG. 8 is an enlarged view of the area near the left side portion 312 in FIG. 7. The walkway 6 is not depicted in FIG. 7. As shown in FIG. 7, four pipes 9 are connected to a pipe 10 extending forward from the vehicle main unit 2, and are disposed along the beam 3. The two pipes 9 on the rear side are for supplying hydraulic pressure to the horizontally pivoting cylinder 44 that pivots the planting device 4 on the left side to the left and right. The two hydraulic pipes 9 on the front side are for supplying hydraulic pressure to drive the planting device 4 on the left end.

Each pipe 9 has a first pipe component 91 and a second pipe component 92. The first pipe component 91 is the portion of a pipe 9 that is disposed on the upper face of the left side portion 312 of the center portion 31 of the beam 3, and the second pipe component 92 is the portion of the pipe 9 that is disposed on the upper face of the left end portion 33 and spacer 34.

Figure 9:
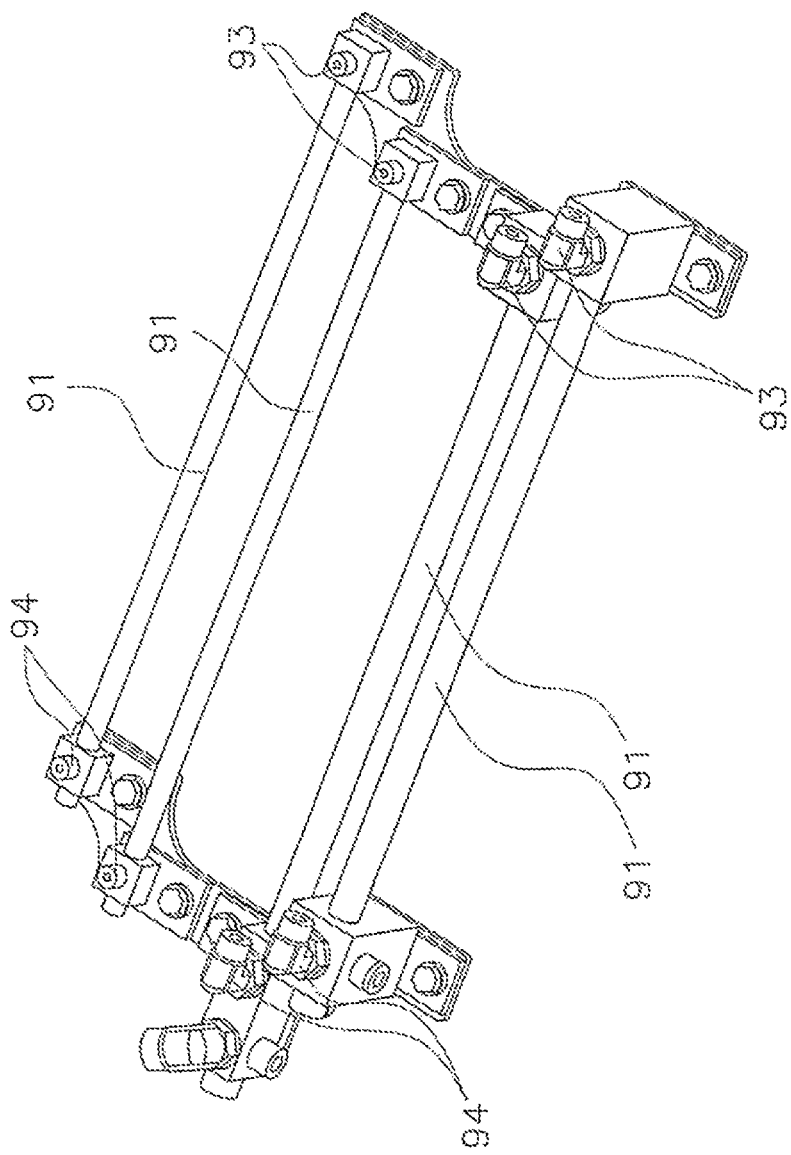
FIG. 9 is an oblique view of the plurality of first pipe components in FIG. 7.

FIG. 9 is a diagram showing only the plurality of first pipe components 91. The first pipe components 91 shown in FIG. 9 are fixed to the upper face of the left side portion 312.

As shown in FIG. 9, each of the first pipe components 91 has a first pipe connector 93 and a second pipe connector 94. The first pipe connector 93 is provided at the left end of the first pipe component 91, and the right end 92a of the second pipe component 92 can be connected. The second pipe connector 94 is provided at the right end of the first pipe component 91, and the right end 92a of the second pipe component 92 can be connected.

In the state shown in FIG. 8 in which the spacer 34 has been mounted, the right end 92a of the second pipe component 92 is connected to the first pipe connector 93. A cap P is attached to the second pipe connector 94. The cap P closes off the second pipe connector 94 and prevents fluid from being discharged from the second pipe connector 94.

Figure 10:
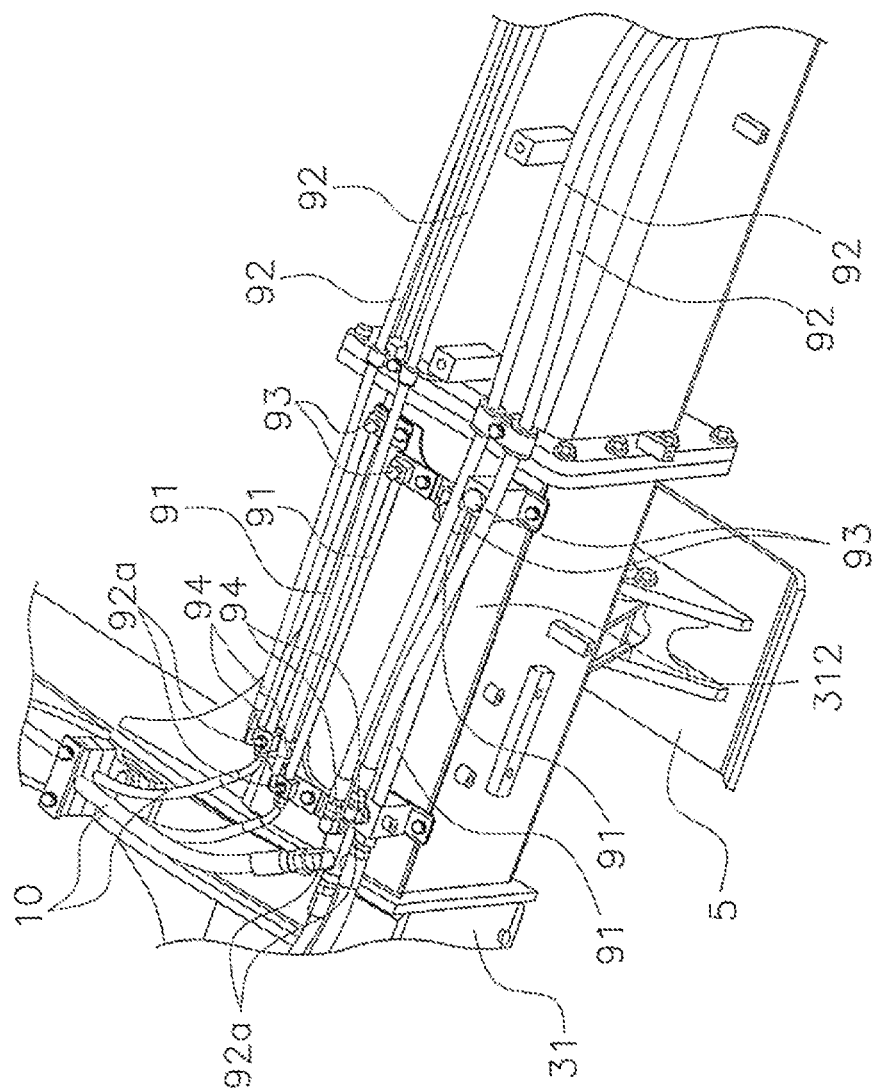
FIG. 10 is an oblique view of the state when the spacer has been removed from between the center portion and the left end portion of the beam of the planting machine of FIG. 1.
Figure 11:
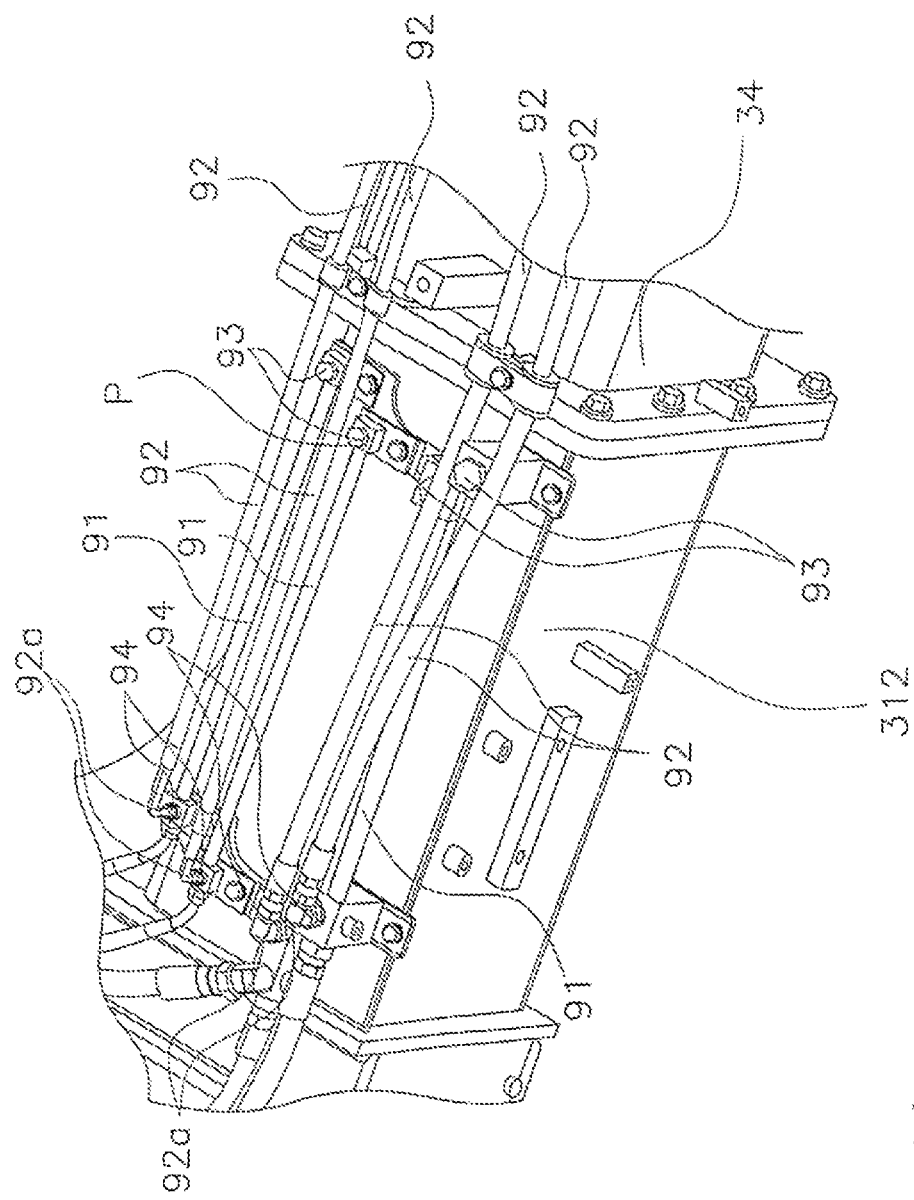
FIG. 11 is an enlarged oblique view of the area near the left side portion in FIG. 10.

FIG. 10 is a diagram of the state when the spacer 34 has been removed from between the center portion 31 and the left end portion 33 of the beam 3. FIG. 11 is an enlarged view of the area near the left side portion 312 in FIG. 10.

As shown in FIGS. 10 and 11, in a state in which the spacer 34 has been removed, the right end 92a of the second pipe component 92 is connected to the second pipe connector 94. A cap P is attached to the first pipe connector 93. The cap P closes off the first pipe connector 93 and prevents fluid from being discharged from the first pipe connector 93. As shown in FIG. 11, part of the second pipe component 92 is disposed above the first pipe component 91.

The first pipe connector 93, to which the second pipe component 92 is attached when the spacer 34 is mounted, is disposed closer to the left end portion 33 than the second pipe connector 94 to which the second pipe component 92 is attached when the spacer 34 is not mounted.

Thus, providing two connectors (the first pipe connector 93 and the second pipe connector 94) that can connect the right end 92a of the second pipe component 92 to the first pipe component 91 allows the length of the pipes to be adjusted according to the length of the beam 3 when the spacer 34 is and is not mounted.

The left side of the beam 3 is described above, but the configuration is the same on the right side of the beam 3 as on the left side.

The tree planting machine 1 (an example of a work vehicle) in this embodiment comprises the vehicle main unit 2, the beam 3, and the plurality of planting devices 4. The beam 3 is attached to the vehicle main unit 2 along the vehicle width direction and is longer than the vehicle width of the vehicle main unit 2. The planting devices 4 are attached to the beam 3.

Consequently, planting can be performed at a plurality of locations in the vehicle width direction at the same time. Also, planting while the vehicle moves forward allows multiple rows to be planted.

Furthermore, since a plurality of planting devices 4 are attached to the beam 3, the coordinates of each of the planting devices 4 are determined merely by calculating the polar coordinates for one point, so control is simple. Thus, it is possible to simultaneously plant in a plurality of locations with a simple configuration.

Also, when the planting devices 4 are operated with hydraulic pressure or the like, the pipes can be disposed along the beam 3, so the pipes 9 can be disposed in an orderly manner.

With the tree planting machine 1 (an example of a work vehicle) in this embodiment, the beam 3 is disposed in front of the vehicle main unit 2.

Consequently, it is possible to drive the vehicle while checking the operation of the planting devices 4.

With the tree planting machine 1 (an example of a work vehicle) in this embodiment, three or more planting devices 4 are provided to the beam 3.

Consequently, planting can be carried out at three locations at the same time.

The tree planting machine 1 (an example of a work vehicle) in this embodiment further comprises the walkway 6. The walkway 6 is provided to the upper face 3*a* of the beam 3.

A worker can move along the walkway 6 on the upper face 3*a* of the beam 3 to get up close to the planting devices 4 when refilling the planting devices 4 with seedlings or during maintenance of the planting devices 4.

The tree planting machine 1 (an example of a work vehicle) in this embodiment further comprises the work tables 7. The work tables 7 are provided on the upper face 3*a* of the beam 3. The work tables 7 are disposed at a position higher than the walkway 6.

Since the position where the planting devices 4 are refilled with seedlings is high, a worker can easily replenish the seedlings by walking along the walkway 6 and standing on a work table 7. This eliminates the need to separately provide a stepladder or the like, do less equipment is required.

The tree planting machine 1 (an example of a work vehicle) in this embodiment further comprises the handrail 8. The handrail 8 is provided to the beam 3 to allow access to the walkway 6.

Consequently, a worker can easily climb up to and down from the walkway 6 provided on the upper face 3*a* of the beam 3.

The tree planting machine 1 (an example of a work vehicle) in this embodiment further comprises the support legs 5. The support legs 5 are provided to the lower surface 3*b* of the beam 3, and support the beam 3 by coming into contact with the ground G when the vehicle is to be parked.

Consequently, when the tree planting machine 1 is in its parked orientation, the support legs 5 can support the load of the planting devices 4 and the beam 3. Therefore, the vehicle can be parked without the planting devices 4 touching the ground. Also, even if a worker accidentally lowers the planting devices 4 during planting work, since the supporting legs 5 hit the ground before the planting devices 4 do, it is possible to protect the planting devices 4.

The tree planting machine 1 (an example of a work vehicle) in this embodiment further comprises the walkway 6. The walkway 6 is provided to the upper face 3*a* of the beam 3. The walkway 6 is disposed on the beam 3 such that its upper face 6*a* will be substantially horizontal in a state in which the beam 3 is supported by the support legs 5 when the vehicle is parked.

This makes it easier for a worker to walk along the walkway 6 when the vehicle is parked.

With the tree planting machine 1 (an example of a work vehicle) in this embodiment, the beam 3 has the center portion 31 (an example of a first beam portion), a right end portion 32 (an example of a second beam portion), and a left end portion 33 (an example of a second beam portion). The center portion 31 is attached to the vehicle main unit 2. The right end portion 32 and the left end portion 33 are provided at the ends of the center portion 31 in the vehicle width direction. A spacer 34 (an example of an extension) for extending the length of the beam 3 can be attached between the center portion 31 and the right end portion 32. A spacer 34 (an example of an extension) for extending the length of the beam 3 can also be attached between the center portion 31 and the left end portion 33.

This allows planting in rows with different spacings.

The tree planting machine 1 (an example of a work vehicle) in this embodiment further comprises the pipes 9. The pipes 9 are disposed along the beam 3. The pipes 9 each have a first pipe component 91 and a second pipe component 92 that is connected to the first pipe component 91. The first pipe component 91 has a first pipe connector 93 (an example of a first connector) to which the second pipe component 92 is connected in a state in which a spacer 34 (an example of an extension) is attached between the center portion 31 (an example of the first beam portion) and the left end portion 33 (an example of the second beam portion), and a second pipe connector 94 (an example of a second connector) to which the second pipe component 92 is connected in a state in which the center portion 31 and the left end portion 33 are directly connected.

Consequently, the length of the pipes 9 can be adjusted in a state in which the beam 3 is either extended or not extended, so slackness and the like can be eliminated.

Since the length of the pipes can be adjusted by providing two connectors to the first pipe component 91, there is no need to carry around parts such as adjustment pipes, so the amount of gear needed during work can be reduced.

An embodiment of the present invention is described above, but the present invention is not limited to or by the above embodiment, and various modifications are possible without departing from the gist of the invention.

Figure 12:
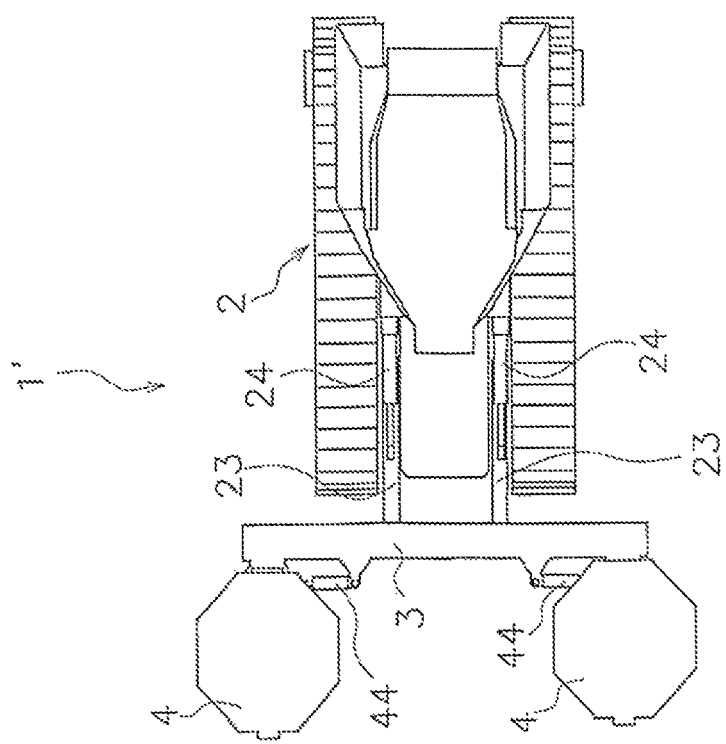
FIG. 12 is a plan view of a planting machine in a modification example of an embodiment of the present invention.

In the above embodiment, three planting devices 4 are provided, but the number is not limited to three. For example, as shown in the tree planting machine 1' in FIG. 12, just two may be provided. Also, four or more planting devices 4 may be provided to the beam 3.

In the above embodiment, the first pipe connector 93 and the second pipe connector 94 are provided to the first pipe component 91, but a pipe connector may be provided at two places of the second pipe component 92 to which the end of the first pipe component 91 can be connected to the second pipe component 92.

In the above embodiment, the beam 3 is provided on the front side of the vehicle main unit 2, but the beam 3 may instead be provided on the rear side of the vehicle main unit 2.

In the above embodiment, the beam 3 can be divided into the center portion 31, the right end portion 32, and the left end portion 33, but it may be designed so that the beams 3 cannot be divided. However, in order to be able to accommodate a multiple widths of planting rows, it is preferable for the beams 3 to be divided.

The tree planting machine of the present invention makes it possible to simultaneously plant at a plurality of locations with a simple configuration, and is useful in forestation over large tracts of land.

What is claimed is:

1. A work vehicle, comprising:
   a vehicle main unit;
   a beam attached to the vehicle main unit along a vehicle width direction, the beam being longer than a width of the vehicle main unit;
   a plurality of planting devices attached to the beam; and
   a storage unit configured to hold seedlings disposed on an upper part of each of the plurality of planting devices,
   the beam being disposed in front of the vehicle main unit, and the beam including
      a first beam portion attached to the vehicle main unit;
      a second beam portion provided to at least one of two ends of the first beam portion in the vehicle width direction, the second beam portion being attachable to the one end of the first beam; and
      an extender attachable between the first beam portion and the second beam portion to extend a length of the beam,
      at least one of the planting devices being provided to the second beam portion.

2. The work vehicle according to claim 1, wherein three or more of the planting devices are provided to the beam.

3. The work vehicle according to claim 1, further comprising
   a walkway provided on an upper face of the beam.

4. The work vehicle according to claim 3, further comprising
   a work table provided to the upper face of the beam,
   the work table being disposed at a position higher than the walkway.

5. The work vehicle according to claim 3, further comprising
   a handrail provided to the beam for climbing up to or down from the walkway.

6. The work vehicle according to claim 1, further comprising
   a pipe disposed along the beam,
   the pipe including a first pipe component and a second pipe component connected to the first pipe component, and
   the first pipe component including a first connector to which the second pipe component is connected in a state in which the extender is attached between the first beam portion and the second beam portion, and a second connector to which the second pipe component is connected in a state in which the first beam portion and the second beam portion are directly connected.

7. The work vehicle according to claim 1, wherein the vehicle main unit includes a plurality of crawler belts for driving.

8. The work vehicle according to claim 7, wherein one of the plurality of planting devices is disposed in front of the vehicle main unit, and
   the other planting devices are disposed outside of the plurality of crawler belts in a lateral direction of the work vehicle.

9. The work vehicle according to claim 7, wherein the plurality of planting devices are arranged to be offset from an extended line of each of the plurality of crawler belts in a planar view.

10. The work vehicle according to claim 1, wherein the work vehicle is a tree planting machine configured to plant seedlings.

11. The work vehicle according to claim 1, further comprising
    a support leg provided to a lower face of the beam, the support leg being configured to support the beam by contacting a ground surface when the work vehicle is parked and to be spaced from the ground surface during operation of the work vehicle.

12. The work vehicle according to claim 11, further comprising
    a walkway provided to an upper face of the beam,
    the walkway being disposed on the beam so that an upper face of the walkway is substantially horizontal when the work vehicle is parked and the beam is supported by the support leg.

* * * * *